United States Statutory Invention Registration [19]

[11] Reg. Number: H796

Miller, Jr. et al. [43] Published: Jul. 3, 1990

[54] OPEN LOOP SEEKER AIMING GUIDING SYSTEM

[75] Inventors: Walter E. Miller, Jr.; Richard W. Currie, both of Huntsville, Ala.

[73] Assignee: The United States of America as represented by the Secretary of the Army, Washington, D.C.

[21] Appl. No.: 441,750

[22] Filed: Nov. 27, 1989

[51] Int. Cl.[5] ..... F41G 7/30

[52] U.S. Cl. ..... 244/3.17; 244/3.11

*Primary Examiner*—Charles T. Jordan
*Assistant Examiner*—Richard W. Wendtland
*Attorney, Agent, or Firm*—James T. Deaton; Freddie M. Bush

[57] ABSTRACT

An open loop seeker aiming guiding system for directing a guided missile from its launching to its impact with a target. The system includes a fire control mechanism for initially controlling the flight of missile toward the target. Located on the missile itself is a seeker homing system for homing the missile onto the target signature. The system includes transition means for transferring control of the missile flight from the ground base fire control to the homing guidance control on the missile itself whenever the signal from the fire control is interrupted, the missile has been in flight a predetermined time, or the homing device on the missile itself locks in on the target to an extent predetermined, by comparing the image it receives from the target to an image stored in a storing device on the missile itself. Whenever either of these conditions occur control of the missile is transferred from fire control to the homing device on the missile.

Significantly, the seeker is blindly pointed approximately at the target, using information derived from the line of sight guidance during the early portion of the flight. This approximate pointing in flight is what enables seeker target acquisition autonomously later in flight with no area target search required.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPEN LOOP SEEKER AIMING GUIDING SYSTEM

DEDICATORY CLAUSE

The invention described herein may be manufactured, used, or licensed, by or for the Government for governmental purposes without the payment to us of any royalties thereon.

BACKGROUND OF INVENTION

This invention relates to an open loop seeker aiming guiding system for directing a guided missile from launch to impact with a moving target. More particularly, this invention relates to a guiding system which combines the advantages of a command to line of sight guiding system with those of a fire and forget terminal homing/seeking guiding system.

Two embodiments of a command to line of sight guiding system are illustrated in FIGS. 1A and 1B and an embodiment of the fire and forget terminal homing-/seeker guiding system is illustrated in FIG. 1C. All of FIGS. 1A, 1B, and 1C are prior art devices. To facilitate an understanding of the present invention these prior art devices will be described in some detail, hereinafter.

In FIG. 1A, the operator or the gunner 10 views target 16 through a device called the target tracker 18. The target tracker may simply be telescope with central cross-hairs to assist in accurate target aiming, a television camera and display, or a night device such as a thermal-imaging sight. In addition to the cross-hairs, it may have other aids to assist in accurate target tracking such as being mounted on a tripod or other stable mounting. It may also contain an inertial or viscous damping mechanism to smooth out tracking errors, or it may even include electronic image stabilization and/or tracking.

In the prior art device of FIG. 1A, the gunner's entire job during a missile operation is to acquire the target in his sight, to place the aiming cross-hairs over the target image, to fire the missile with a trigger pull, and then to keep the cross-hairs aligned over the target as smoothly as possible until the target is impacted by the missile.

Mounted as closely as possible to the target tracker 18 is a missile tracker 20. The missile tracker 20 is mechanically boresighted with the target tracker 18, so as to always possess a central tracking axis which is exactly parallel to the operator's line of sight to the target as established by the target tracker 18. The missile tracker 20 is also responsive to missile signature 36, which is usually augmented with an artificial signature-generating device 26 known as a missile beacon. If the missile is not centered on the missile tracker boresight axis, an error signal is generated which is representative of the missile angular offset from the missile tracker's boresight axis. This error signal is sent to guidance computer 22, which contains an angle-to-linear conversion device which multiples it by an approximation of the missile range, derived from the time expired following the launch of the missile. It also contains a low pass filtering device to reduce the noise effects, and lead circuits to compensate for measurement delays, to create a stable servo-mechanism with the missile dynamics when the control loop is closed. When the missile position voltages have been so modified they are called commands and are used to direct the missile back to the boresight axis of the target tracker.

The command signals are sent to the command transmitter 24, which may comprise a radio link, an optical link, or a wired link 38, to convey these commands to the missile in flight.

A missile receiver 30, which is located on the missile, and may comprise respectively a radio, or an optical or a telephonic receiver, accepts the commands and decodes them from a carrier (if they are so encoded) and sends the commands themselves to the missile autopilot 28. Autopilot 28 is an electronic/inertial package that is used to stabilize the missile guidance by measuring the body axis angles and using the angles to moderate the guiding commands. The guiding commands, so moderated, are sent to control mechanism 32, which may comprise vanes, thrusters or tail fins. The operation of control mechanism 32 causes the missile to maneuver vertically and/or horizontally toward the missile tracker boresight axis. The missile beacon, as a component mounted on the missile structure, is by this maneuver, re-positioned in space. The new position is then measured by the missile tracker 20 for a new computation, and the closed loop guiding system is completed.

This process continues, without knowledge of or use of range information, until the missile eventually impacts whatever object is under the cross-hairs of the gunner's target tracker 18.

Referring now to prior art FIG. 1B which shows a variation of a line of sight guidance system called the laser beamrider system. This variation comprises replacing the missile tracker 20 (in FIG. 1A) with beam projector 23 which projects a spatially coded beam 25 to a missile receiver 40. The beam projector 23 spatially modulates the beam over its cross-section and the modulation is received by the missile receiver 40. The missile position in space is determined by decoding this spatial information in the position decoder/corrector 42. The various low pass and lead filters, which were employed in the guidance computer 22 of FIG. 1A are also included in the decoder/corrector 42 of FIG. 1B. The output from the position decoder/corrector 42 to autopilot 28 is the same in the variation of FIG. 1B as it was in the system of FIG. 1A, and is used to control the flight of the missile in the same way as described in reference to FIG. 1A. A laser beam guiding system is described in detail in U.S. Pat. Nos. 3,782,667; 3,807,758; 4,696,411; and SIR No. H299.

Another prior art device is illustrated in FIG. 1C, which shows a general functional block diagram of an imaging seeker guidance system. The system illustrated in FIG. 1C functions in the following manner. An operator 10 first surveys his battlefield area of responsibility with a target acquisition device which is external to the missile system and is not shown. This device could be a radar system or as simple as a pair of binoculars. Upon detecting/selecting a suitable target, the gunner activates the missile system by applying power to at least the seeker and processing subsystems of missile 14. The fire control base 12 is usually located on the ground with the operator 10. At that point, the operator's display is automatically changed. A seeker image display 47 is shown in FIG. 1C, using outputs derived from 50, 52, 46 & 34, as described later.

The operator manually inserts target selection information into the imaging processing device 46, by the use of a light pen on the display screen or with a joystick input to place electronic cross hairs on the target. The image processor 46 then transmits a signal to a gimbal driver 48 to direct the seeker's gimbals, located on the missile, so that the target is in the center of the seeker field of view. In the event that the externally located target is not within the seeker field of view at all upon initial missile activation, operator 10 may directly input commands to the gimbal driver 48 to search an area through the seeker system. When the target is reacquired in the seeker image display 47, input target selection information is transmitted to the image processor, as noted before.

Once the image processor is correctly commanding the gimbal driver 48 so as to center the seeker's gimbals on the target, the missile may be fired by pulling the trigger. At that time, the fire control 12 is disconnected from the missile, which is launched and proceeds downrange towards the target. Operator 10 has no further interaction or control over the missile 14.

In flight, the seeker receives target 16 signature signals through optics 50 and images them with imaging sensor 52. The imaging sensor 52 transmits its images through a signal output means 54 which selects, formats, and drives this data off-gimbal to the imaging processor 46. The imaging processor 46 tracks the preselected target 16 through the missile and target motions and generates correction signals which are sent to the gimbal driver 48. This causes the seeker boresight to remain centered on target 16, regardless of relative motion between the target 16 and missile 14.

A gimbal position sensor 56 measures the relative angle and angle rates between the seeker gimbals and the missile 14. These measurements are sent off-gimbal to the guiding algorithm computer 58, which may include an autopilot. For example, a simple pursuit navigation algorithm will simply fly the missile along the seeker line of sight to the target, i.e. turn the missile until the gimbal position sensor output is zero. A more accurate algorithm is a well known one called proportional navigation. This algorithm maneuvers the missile body until the angular rate from the gimbal position sensor 56 is zero independent of the actual angle. That will turn the missile in the direction to decrease the angle rate. When a near zero rate is achieved, the missile is on an interception path with moving target 16.

In either case, the guidance algorithm computer 58 provides command signals to control mechanism 32, which causes the missile to maneuver until the algorithm is satisfied. This process continues until the missile eventually impacts with a target having the image being tracked by the image processor 46.

SUMMARY OF THE INVENTION

It is an object of this invention to provide an open loop seeker aiming guiding system for guided missiles which incorporates the best features of both the command to line of sight system and the terminal homing system to provide a guiding system which is more accurate and safer for the operator under more battlefield conditions than either alone.

Another object of the invention to provide an open loop seeker aiming guiding system, which is under the control of the operator for a predetermined period of time or until the guiding system locks onto a preselected target.

Yet another object of the invention is provide an open loop seeker aiming guiding system which will discriminate between a preselected target and other adjacent fixed or moving objects.

These objects are accomplished by providing an open loop seeker aiming guiding system which incorporates the best features of the command to line of sight and terminal homing seeking guidance systems by providing a functional interfacing system for guiding the missile to preselected targets.

DETAIL DESCRIPTION OF THE DRAWING

Figure 2:
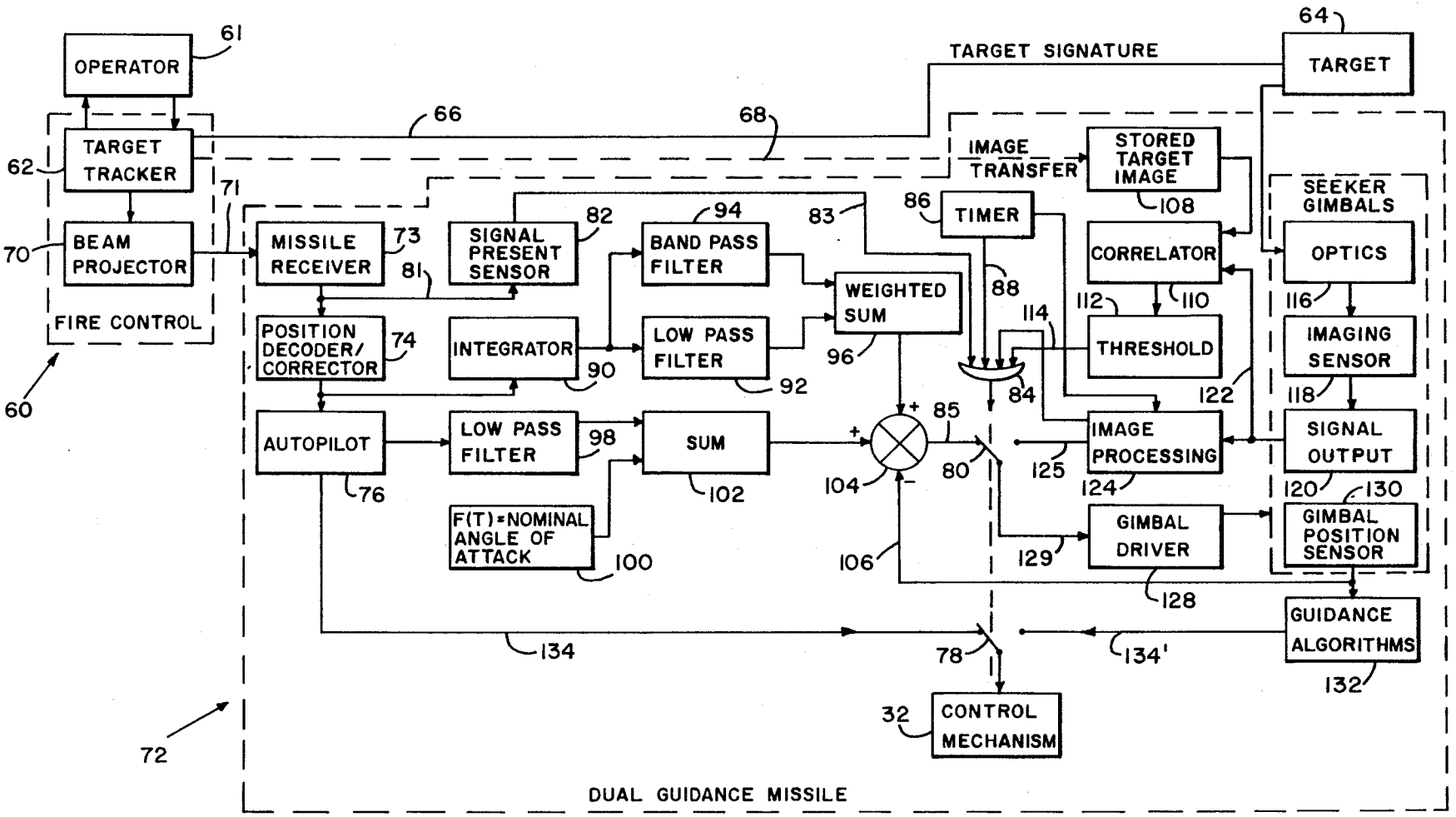
FIG. 2 is a functional diagram illustrating a first embodiment of the open loop seeker aiming guiding system of the invention.

Referring now to FIG. 2 of the drawing an operator or gunner 61 views the target 64 through an image-based target tracker 62 which forms an image of the target within target tracker 62. This image is transmitted by electronic means over line 68 to the target image storer 108. In the alternative, one of several pre-stored images (in 108) may be selected by gunner if one of them adequately matches a desired target. The selected target is tracked by tracker 62, and the beam projector 70 is thus pointed accurately at the target. Beam projector 70 transmits a spatially coded beam 71 to a missile receiver 73, located on the missile itself. The target tracker and beam projector are located in a fire control 60 which is usually on the ground with the operator. All of the other elements of the system are carried on the missile 72. The signal received by missile receiver 73 is transmitted to position decoder/corrector 74 and thence to autopilot 76.

Autopilot 76 transmits the signal it receives through control line 134 and double pole switch 78 (in the position shown in FIG. 2) to control mechanism 32 to control the flight of the missile. Switch 78 remains in the closed position illustrated in FIG. 2 as long as the switch 80 remains in the position illustrated in FIG. 2. Switch 80 is a double pole transition switch which causes the missile guiding system to change from control by operator 61 (in the manner just described) to control by the seeking mechanism, as will be described in more detail hereinafter.

Signal line 81 is also connected to the output of missile receiver 73 and transmits the signal to a signal sensor 82. As long as the signal sensor 82 detects the presence of a signal (due to reception of beam signal 71), a signal will be transmitted through line 83 to an OR gate 84 controlling switch 80. Switch 80 is a double pole switch which initially connects line 85 with line 129 so that the output of the summing juncture 104 is transmitted to the gimbal driver 128. When the signal sensor 82 fails to sense a signal out of missile receiver 73 OR gate 84 causes switch 80 to change its position to connect line 125 to line 129 so that the image processing device 124 then controls gimbal driver 128. At the same time switch 80 changes its position, switch 78 also swings to connect line 134' with the control mechanism 32 and to disconnect line 134 from control mechanism 32.

During the command to line of sight operation, the signal transmitted by the position decoder/corrector 74 to autopilot 76 is also transmitted to integrator 90, which then transmits the signal to both a low pass filter 92 and band pass filter 94. The low pass filter 92 produces a cross wind induced rate signal (actually steadily state rate errors) and band pass filter 94 produces a target crossing rate signal (similarly transient rate errors) which are transmitted to a weighted summer 96. The weighted summer 96 then transmits the combined signals to control servo input summing juncture 104.

The signal generated by autopilot 76 is also transmitted to a low pass filter 98, and thence, to summer 102, where it is added to a signal produced by nominal angle of attack device 100 typically a predetermined function of time) to generate a static look angle estimate signal which is fed into input summing juncture 104. These two inputs to juncture 104 cause the seeker gimbal driver 128 to point the gimbals at an estimated target position based on the line of sight guidance information plus autopilot initial information, i.e. output 85.

During the entire operation of the guiding system, optical imaging device 116 collects an image of target 64 and transmits a signal to imaging sensor 118, corresponding to the image detected. Image sensor 118 transmits its signal to signal output device 120 (buffer). Signal output device 120 then transmits its signal to image processing device 124, and to correlator 110 via line 122. Correlator 110 also receives a signal from stored target image device 108, and compares the signal it receives from the signal output device 120 to determine whether the observed image received by optical device 116 is substantially the same as the stored target image it receives from image storing device 108. When the correlator 110 detects a correlation between the sensed image and the stored image to a predetermined degree of correlation, a signal is transmitted to threshold device 112, which transmits a signal through line 114 to OR gate 84. A signal from threshold device 112 to OR gate 84 causes double pole switch 80 to make its transition from the position shown in FIG. 2 to its alternate position, and also changes the position of switch 78 and disconnects control of the missile flight path from the fire control base 60, and from the control of operator 61.

Figure 1A:
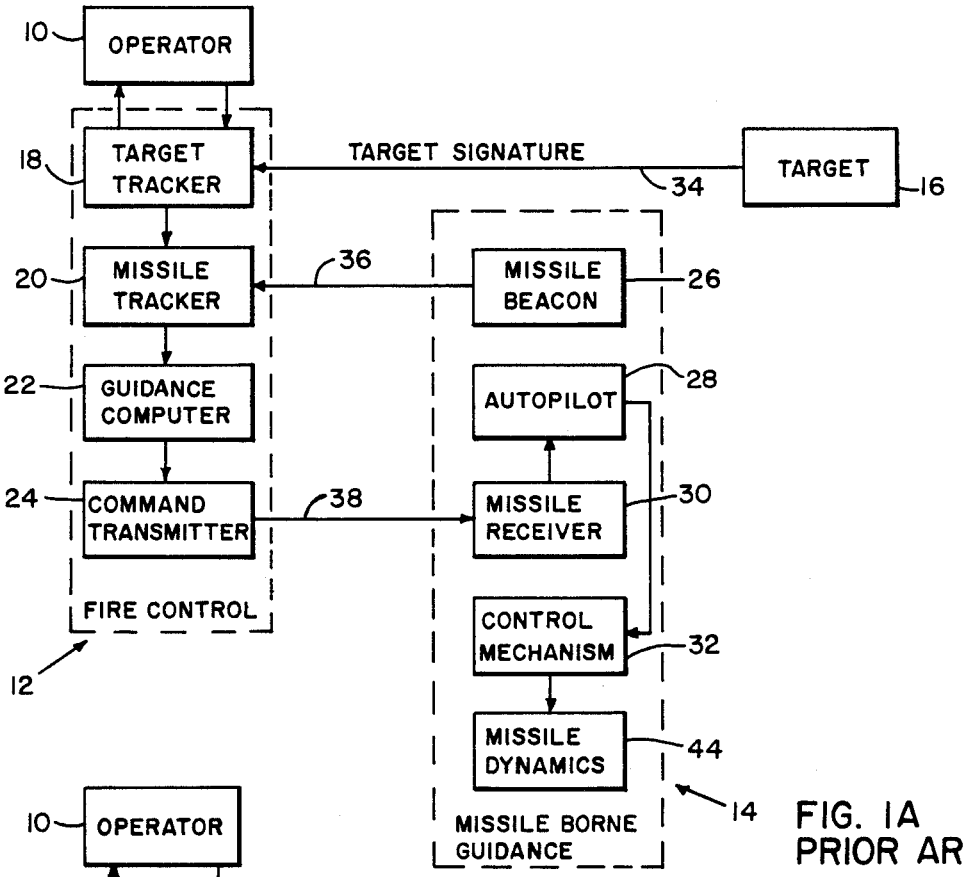
FIG. 1A PRIOR ART
FIGS. 1A, 1B, and 1C, are each a functional diagram illustrating a prior art method and device for guiding missiles to impact with a target.
Figure 1B:
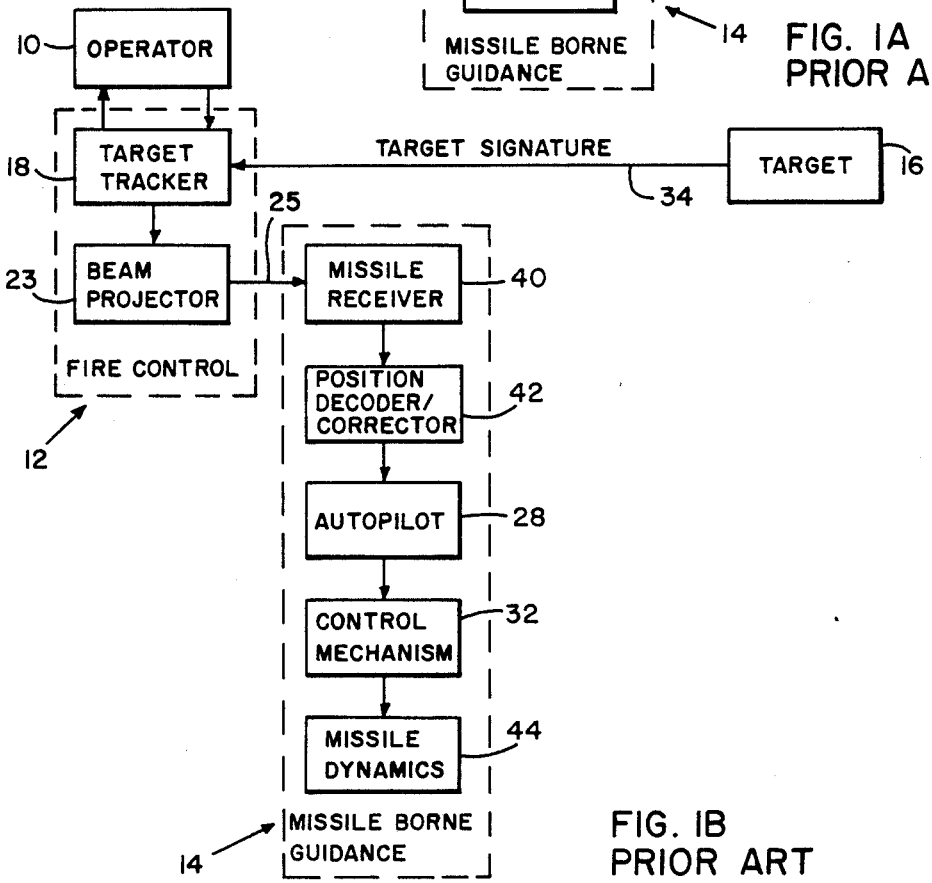
FIG. 1B PRIOR ART
Figure 1C:
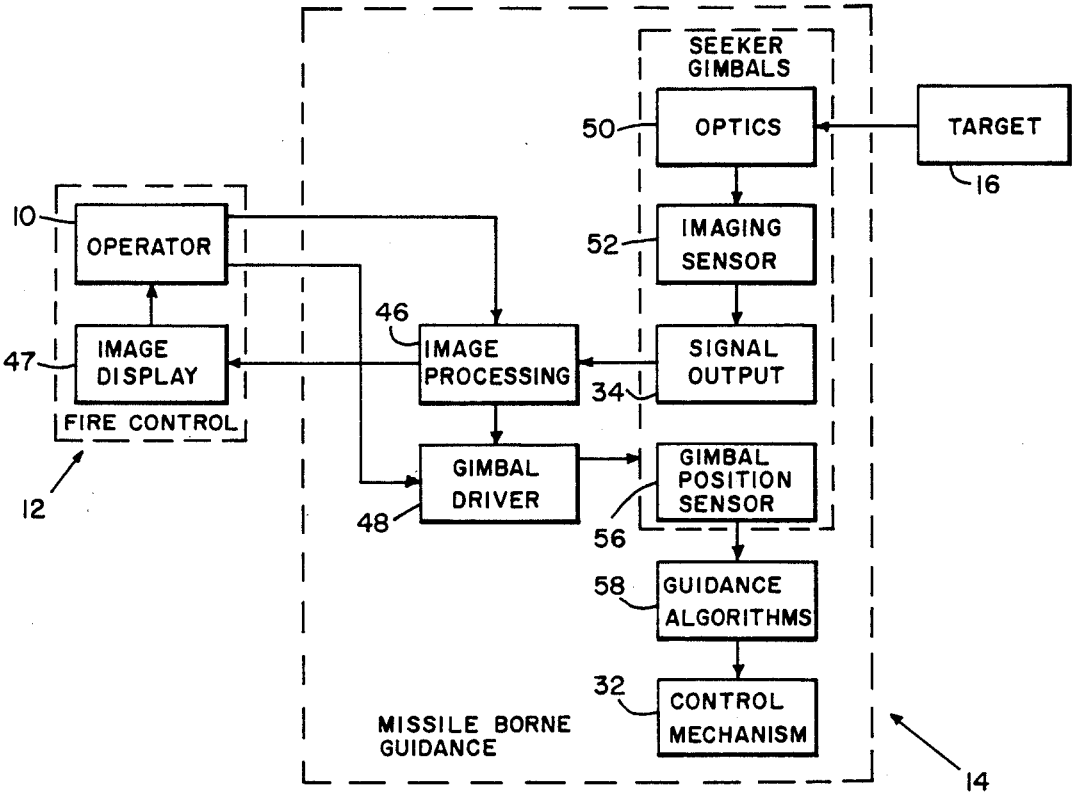
FIG. 1C PRIOR ART

Another means for changing the position of switches 80 and 78 is provided by timer 86 which is set to a time predetermined to be about ½ of the normal flight time of the missile from launching to its impact with the target. However, this time can be adjusted as desired by the operator. Timer 86 transmits a signal through line 88 to OR gate 84 which changes the position of double pole switch 80 and double pole switch 78, to cause the control of the missile to make a transition from the control of the operator to the control of seeker portion of the guiding system, (82, 86, or 112), whichever occurs first. Once switches 80 and 78 are changed, the guidance is identical to that of FIG. 1C.

In the operation of the system of the FIG. 2, the change of guidance may be exercised in the following manner. Control mechanism 32 initially receives its input from autopilot 76 with transition switch 80 in the illustrated position. While switch 80 is in the position illustrated the operator 61 may switch targets as desired. However, upon the expiration of a predetermined time set in timer 86 (which is chosen to be near maximum accurate range of the beam projector missile guidance system) OR gate 84 will operate transition switch 80 to disconnect the control of the missile guidance from the operator and to establish control in the seeker homing device on the missile. Switch 80 will also be moved to its alternate position when the signal from the beam projector to the missile receiver is interrupted for any reason for a continuous period of about ⅓ of a second through the action of 82 & 84. This interruption could be caused by the choice of the operator or due to his being impaired.

Another way that the switch 80 can be moved occurs when the image detected by optical device 116 is determined to correlate with the stored target image to a preselected threshold level by correlator 110. When correlation with the prelaunch stored image exceeds the preset threshold it activates OR gate 84 and switch 80 and the seeking device takes over control of guiding the missile to the target. The OR gate 84 may also be operated when the image processing device 124 detects a closed contour object within one target diameter of the seeker center field of view. This is a lower level of confidence that the seeker is acquiring the same target previously selected by the operator and also includes the condition that the missile is at least ¾ of its maximum range before being valid, by correlating with timer 86.

Referring again to FIG. 2, immediately after the missile launch, signals from the position decoder/corrector 74 begin to be received by integrator and low pass filter respectively. The signal to low pass filter 92 extracts the average missile body axis angle from the autopilot output (which is the real time measurement for this angle). This signal is summed at summer 102 with an estimate of the missile angle of attack 100 required to compensate for gravity by the nominal angle of attack function device 100. This sum is the estimate of the static body axis angle with respect to that axis at the time of launch, which is the first order estimate of direction to the target.

The signal received by integrator 90 from position decoder/corrector 74 is the linearized missile position data. Integration of the linearized missile guidance position data, where left-to-right and up-and-down errors occur equally often, should be near zero. A crosswind, however, causes more or less steady down-wind position error which the integrator and the low pass filter will extract from the signal as a linearly increasing ramp. Similarly, a rapidly crossing target will cause a consistent hang-off error, but due to the line of sight guidance law this error increases as the missile closes in on the target. In this case, the integrator will then output a more rapidly increasing signal. The band pass filter, following the integrator, separates this component if it is present. The two signals derived by the band pass filter 94 and low path filter 92 are added in the weighted sum circuit 96 to obtain the first order estimate of direction to the target caused by the two engagement conditions.

The static look angle estimate at summer 102, and the lead angle estimate at weighted summer 96, are added in a circuit feedback null point 104. This sum goes to the gimbal driver 128 through summing juncture 104, at all times, between the time the missile is launched and its transition from the line of sight guidance to the seeking guidance, as mentioned above. Upon that transition, the signal received from the autopilot 76 is disconnected and control of the flight of the missile now comes through image processor 124, directly to gimbals driver 128. Thereafter, the seeker gimbal directs the flight of the missile to its impact with the target 64.

Figure 3:
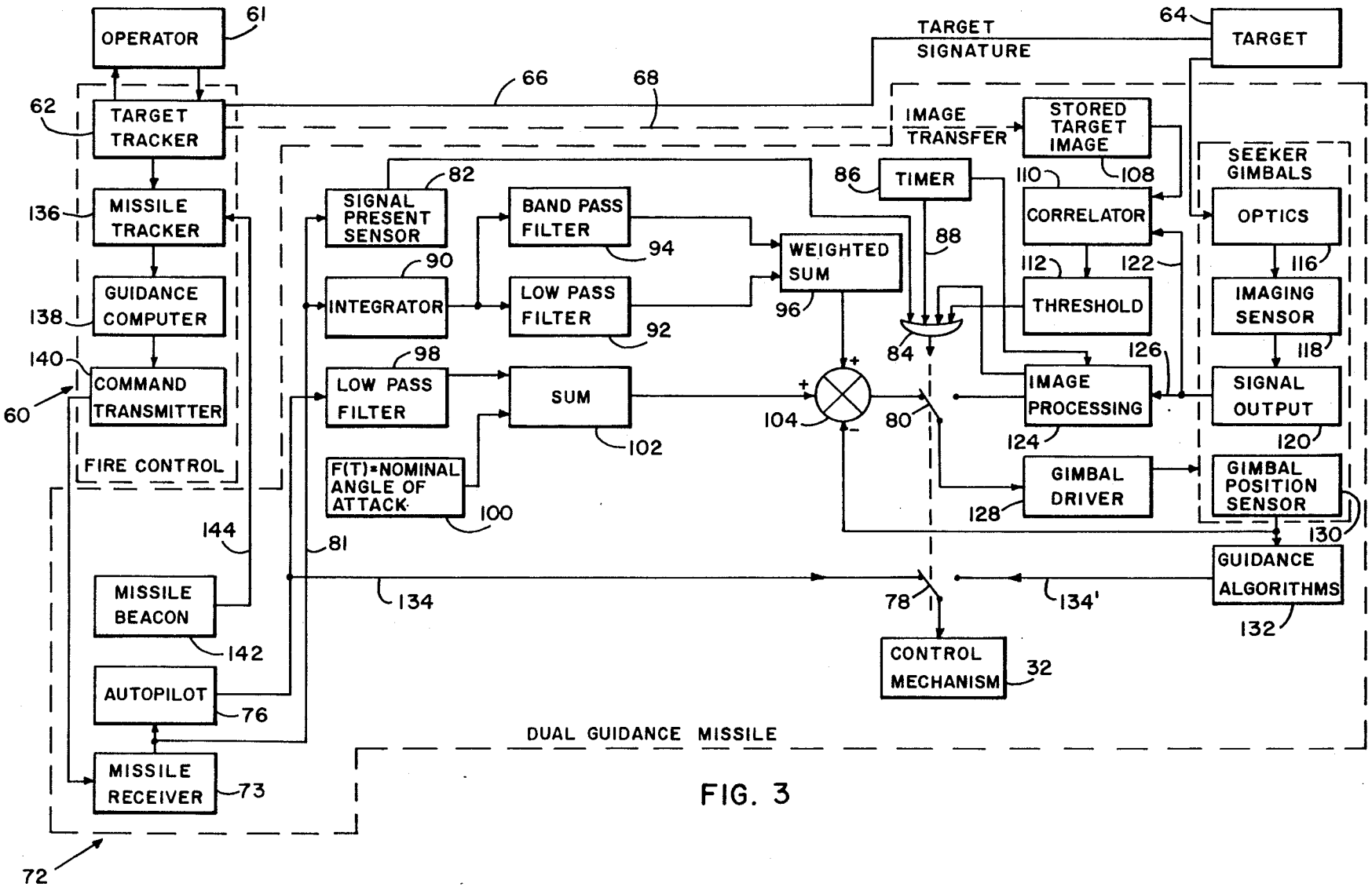
FIG. 3 is a functional diagram illustrating a second embodiment of the invention.

Referring now to FIG. 3 wherein initial control of the missile guidance is exercised by operator 61 through target tracker 62 which receives the target signature 66 from target 64. The signal generated by the target signature is combined with a signal from boresighted missile tracker 136 in guidance computer 138, which then transmits the combined signal to the command transmitter 140. The signal generated by the command transmitter 140 is transmitted as guidance commands to missile receiver 73, and thence, to autopilot 76 for guiding the missile during the initial portion of its flight through switch 78. The signal generated by the autopilot 76 is also transmitted directly to low pass filter 98. The signal received from the missile receiver is also transmitted to the intergrator 90 and the signal present sensor 82. In all other respects the system of FIG. 3 functions as did the system in FIG. 2.

Hereinabove, the invention has been described with reference to two embodiments of the system. It is to be understood, however, that various changes may be made without departing from the scope of claims appended hereto.

What is claimed is:

1. An open loop seeker guiding system for directing a guided missile from launch to impact with a target, comprising:

(a) line of sight means for acquiring an image of said target;

(b) control means disposed on said missile for controlling the flight of said missile to guide said missile along a flight path;

(c) means for tracking said target and for transmitting a signal to said control means corresponding to the disposition of the target;

(d) image storing means disposed on said missile for storing an image of said target;

(e) means for transmitting the target image acquired by said line of sight means to said image storing means;

(f) means disposed on said missile for detecting said target during flight and for forming an image thereof;

(g) means for comparing said detected image to said stored image; and (h) means for disconnecting said control means from said signal transmitted by said target tracker when said signal is interrupted for a predetermined amount of time, when said missile has been in flight for a predetermined period of time, or when the said detected image matches said stored image to a predetermined degree, whichever occurs first, whereupon said means for detecting said target is connected to said control means for guiding said missile on a path to intersect and impact with said detected target.

2. An open loop seeker aiming guiding system as set forth in claim 1, wherein said target image acquired by said line of sight means comprises a preselected image.

3. An open loop seeker guiding system as set forth in claim 1, wherein said target image acquired by said line of sight means is the image observed by an operator at the time the missile is launched.

4. An open loop seeker aiming guiding system as set forth in claim 1 wherein said line of sight means and said target tracking means are a part of a ground based fire control.

* * * * *